Feb. 13, 1923.　　　　　　　　　　　　　　　　　　　　1,444,937.
A. T NOGRADY.
AXLE.
FILED APR. 25, 1921.　　　　　　　　　　　　　6 SHEETS—SHEET 4.

INVENTOR
Andor T. Nogrady.
BY
ATTORNEY

Feb. 13, 1923.
A. T NOGRADY.
AXLE.
FILED APR. 25, 1921.
1,444,937.
6 SHEETS—SHEET 6.
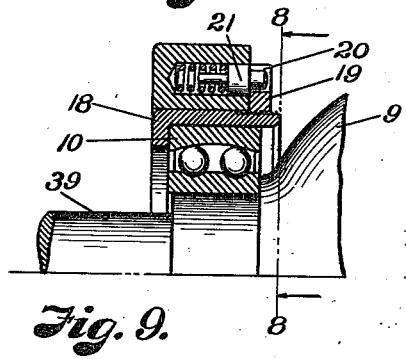
Fig. 7.
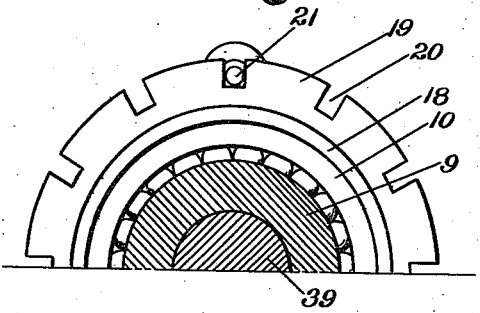
Fig. 8.
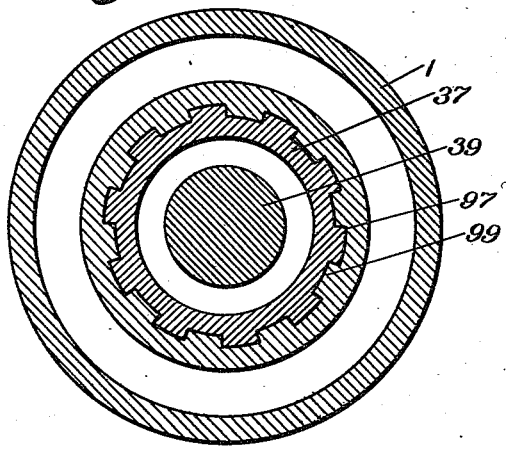
Fig. 9.     Fig. 10.
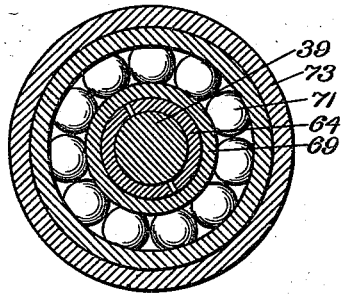
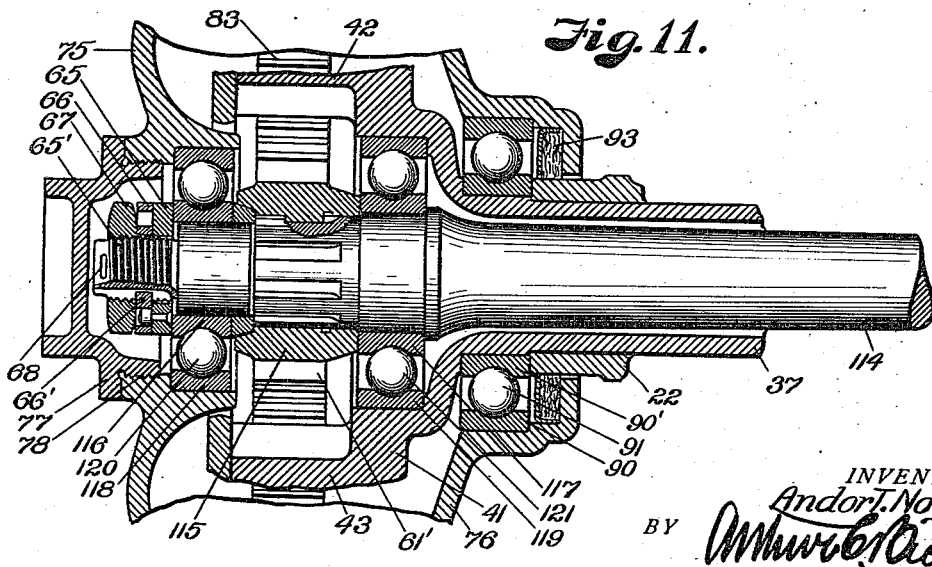
Fig. 11.
INVENTOR
Andor T. Nogrady.
BY
ATTORNEY Patented Feb. 13, 1923.

1,444,937

UNITED STATES PATENT OFFICE.

ANDOR T. NOGRADY, OF WYANDOTTE, MICHIGAN, ASSIGNOR TO THE NOGRADY DIFFERENTIAL COMPANY, OF WICHITA, KANSAS, A CORPORATION OF WEST VIRGINIA.

AXLE.

Application filed April 25, 1921. Serial No. 464,374.

*To all whom it may concern:*

Be it known that I, ANDOR T. NOGRADY, a citizen of the United States, residing at Wyandotte, in the county of Wayne and State of Michigan, have invented certain new and useful Improvements in Axles; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to geared power transmissions for the rear axles of motor vehicles.

The invention contemplates an improved construction of axle and transmission shaft which may be driven through the differential in such manner that certain strains and stresses to which an axle and wheel are inherently subjected may be equalized in an efficient manner.

The invention also contemplates means whereby the gear sets for driving through the axle and wheel hub may be arranged in units which simplifies the construction of the transmission and expedites the method of assembly.

Another important feature of the invention is the provision of means whereby the gear ratio may be changed between the differential and the wheel hub, thus making it possible to standardize the power transmission elements such as the engine, the transmission gears and the differential and afford means for varying the gear ratio between the gear sets and the wheel hubs without disturbing any of the power transmitting mechanism between the engine and the differential.

Among the manifold advantages of my invention is also the provision of means for improving the general arrangement of parts and combinations of parts of mechanism for transmitting power from the differential to the wheels.

In the drawings,

Fig. 7 is an enlarged sectional view of the differential housing bearings.

Fig. 8 is a sectional view on the line 8—8 of Fig. 7.

Fig. 9 is a sectional view on the line 9—9 of Fig. 2.

Fig. 10 is a sectional view on the line 10—10 of Fig. 3, and

Fig. 11 is an enlarged detail, sectional view through a modified form of hub and hub mounting.

Figure 1:
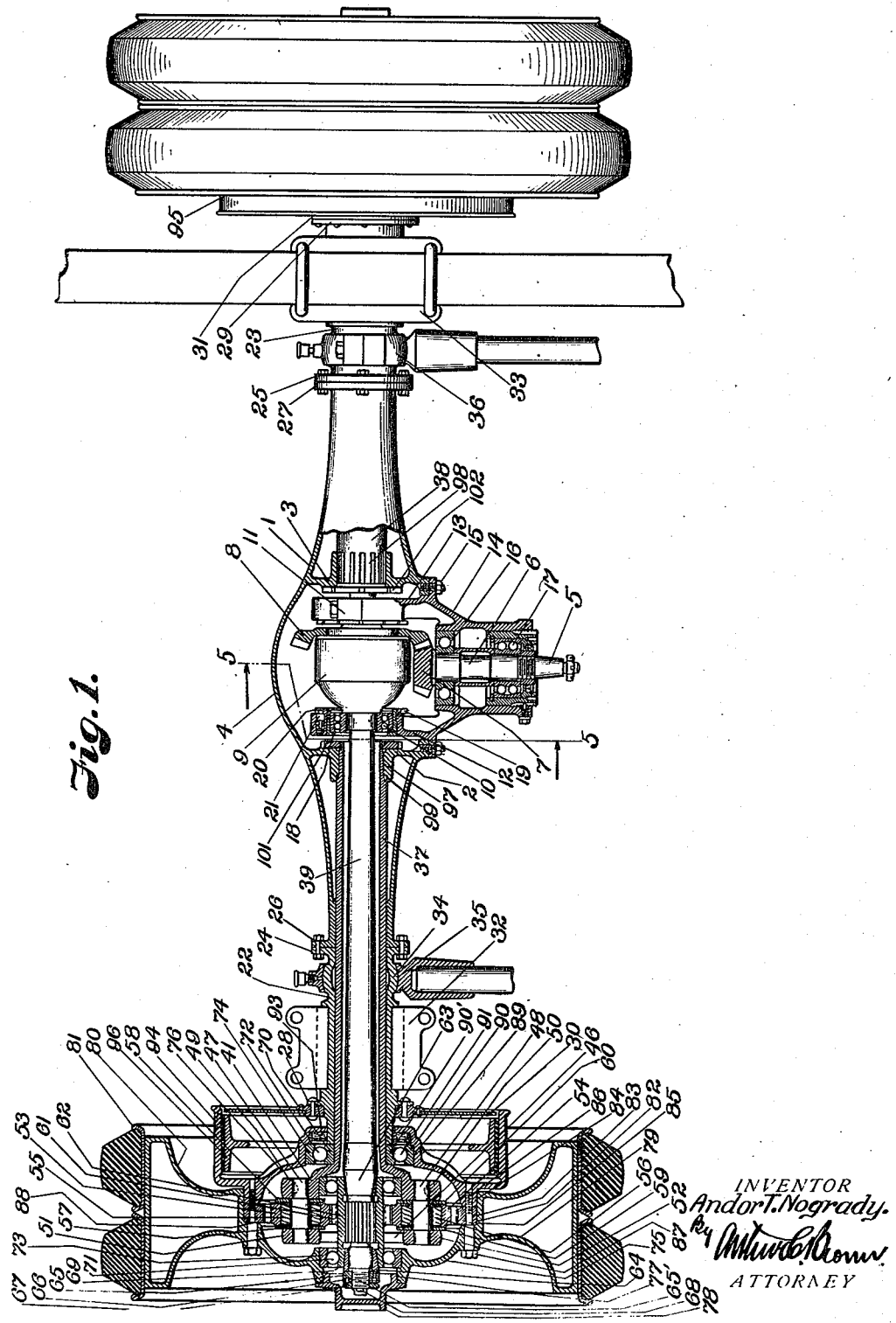
Fig. 1 is a view partly in plan and partly in section of the rear axle of a motor vehicle, showing the axle and its complementary parts constructed in accordance with my invention.

The axle housing is shown as consisting of an intermediate member 1, which may be a casting having inwardly disposed webs 2 and 3, spaced apart and constituting the end walls of the gear case 4, in which is located the differential gearing of approved construction. The rear axles may be driven from the transmission shaft at 5 to the stub shaft 6, on one end of which is a pinion 7, which drives the master wheel 8 rigid with the differential gear housing 9. The housing 9 is supported in bearings 10 and 11 carried by the webs 12 and 13 of the tubular member 14, which is shown as bolted to the gear case by the fastening device 15, the tubular member carrying bearings 16 and 17 which support the shaft 6. The outer rings 18 for the bearings are held against rotation by the lock washers 19, which are provided with peripheral slots 20 to be engaged by the spring-projected bolts 21, carried near the outer free ends of the webs 12 and 13, as clearly seen in Fig. 1.

The central casting 1 carries tubular end castings 22 and 23 which are provided with end flanges 24 and 25 respectively adapted to be bolted to the end flanges 26 and 27 of the casting 1. The flanged connection at the points indicated (which are substantially midway between the transverse center of the axle and the wheels) tend to resist the bending movement and thereby strengthen the axle at vital points, as will be clearly seen by reference to Figs. 1 and 2. The axle sections 22 and 23 are also provided with peripheral flanges 28 and 29 near their respective outer ends, to which are secured dust guards or fenders 30 and 31 to reduce the liability of access accumulation of dust, dirt and other foreign substances upon the brake band or against the surface of the drum, it being understood that it is desirable to prevent accumulation of extraneous matter between the braking face of the brake band and the complementary face of the brake drum in all instances.

The castings or axle sections 22 and 23 also carry spring pads 32 and 33 to which the body supporting springs may be secured and near the inner ends of the respective castings 22 and 23 are convex portions 34, to which the straps 35 and 36 for the radius rods may be fastened so that the radius rods will be effectively tightened to the axle housing in such manner that slight motion may be provided for.

Figure 3:
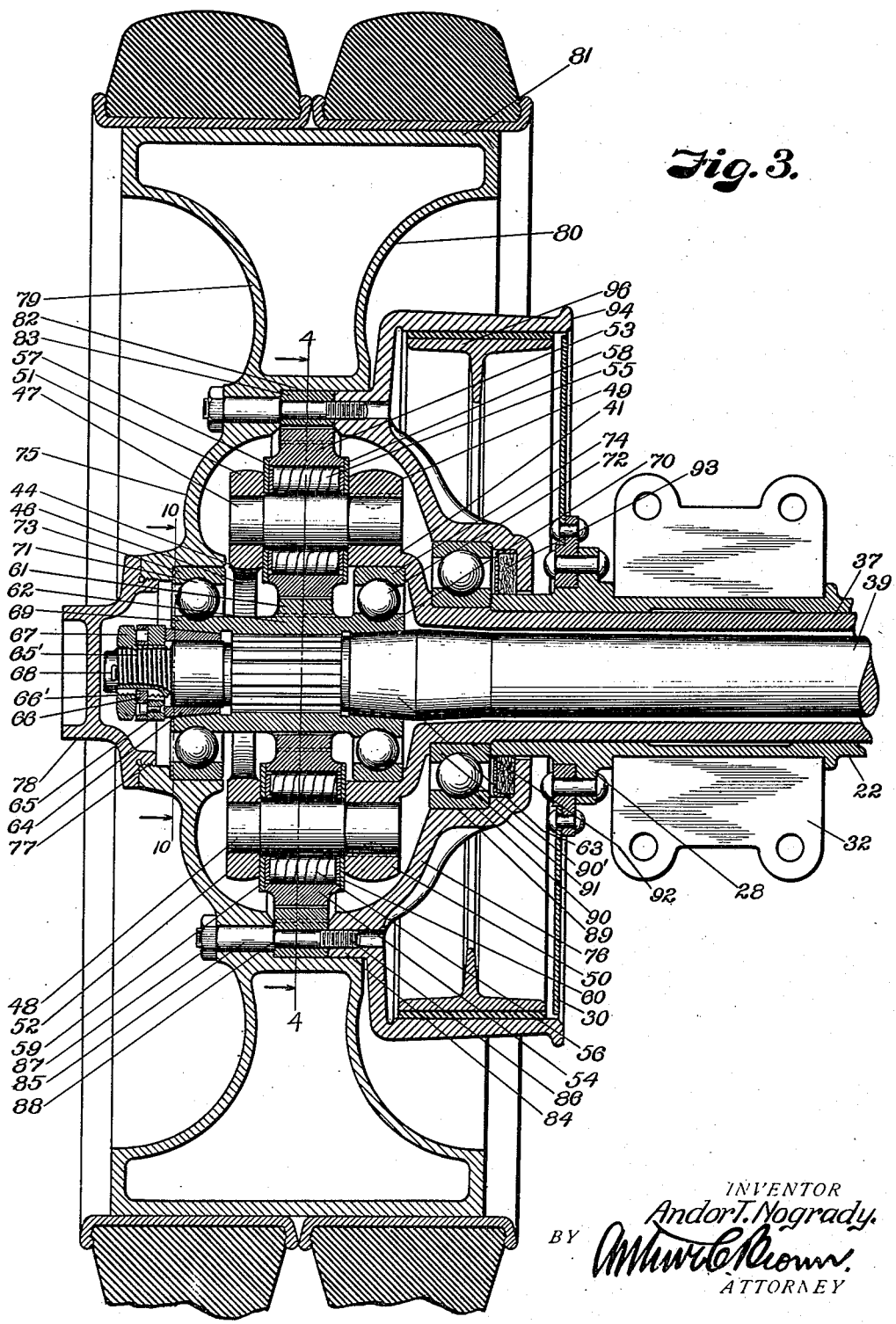
Fig. 3 is an enlarged, horizontal sectional view through the wheel hub and part of the axle housing, transmission housing and transmission shaft, taken on line 3—3 of Fig. 4.
Figure 4:
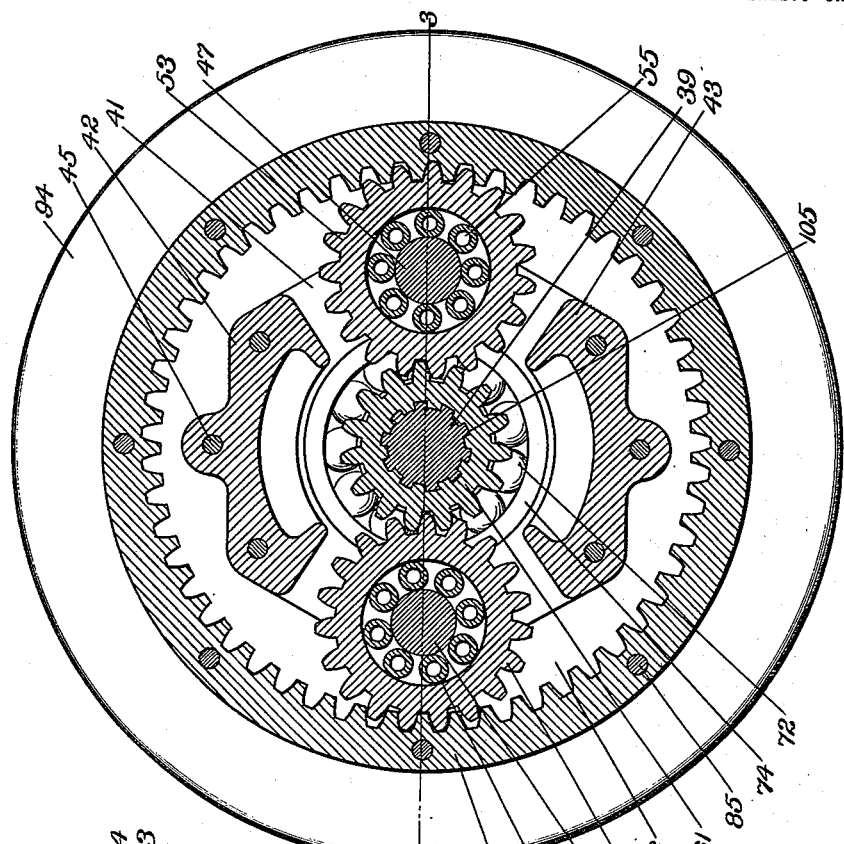
Fig. 4 is a cross sectional view on the line 4—4 of Fig. 3.
Figure 5:
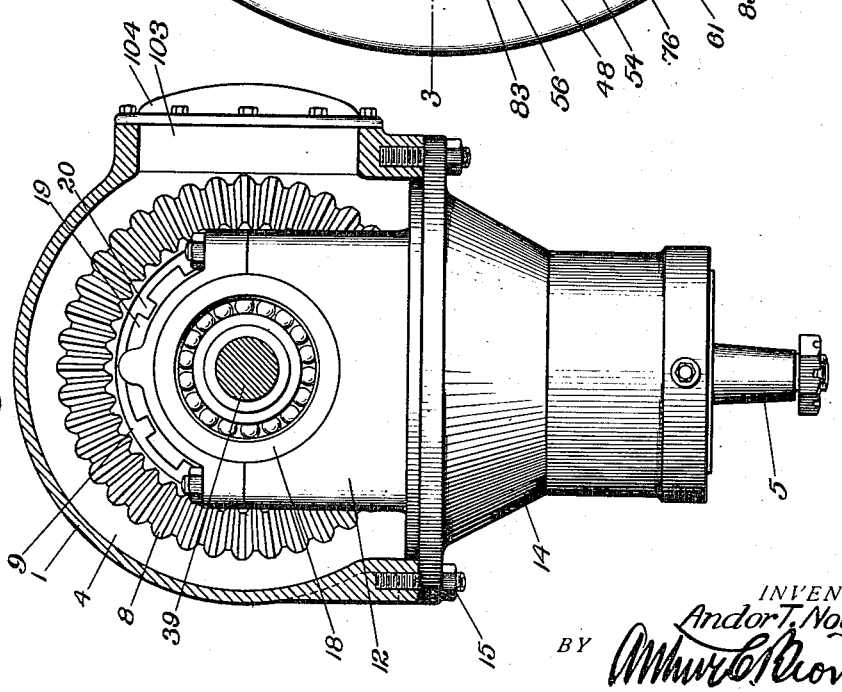
Fig. 5 is an enlarged sectional view on the line 5—5 of Fig. 1.
Figure 6:
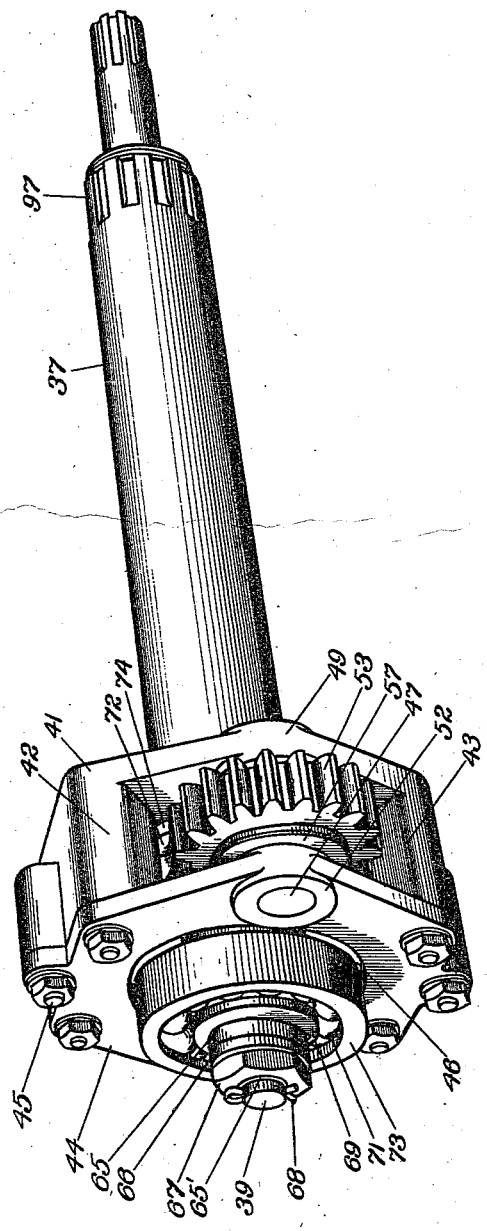
Fig. 6 is an enlarged detail, perspective view of a transmission gear set, the gear carrying edge and one of the axle units.

The transmission housing members 37 and 38 are shown as elongated tubes carrying the housing or heads for the gear sets, through which power may be transmitted to the wheel hubs through the power transmission shaft or divided axle members 39 and 40. One of the transmission housing members and its complementary parts is illustrated in detail in Fig. 6 as comprising a tubular member, on one end of which is a head 41 having diametrically opposite, laterally projecting portions 42 and 43 to provide a space for the reception of intermediate gears to receive power from the transmission shafts or axle members and deliver it to the hubs of the rear wheels. The ends of the members 42 and 43 are connected by a plate or disk 44, secured by the fastenings devices 45. The plate 44 is provided with a concentric opening 46 through which projects one of the axle members, for example, 39. The disk 41, projections 42 and 43 and cover 44 constitute a recessed head in which the intermediate gears are mounted. These gears are best shown in Figs. 3, 4 and 6 as mounted upon shafts 47 and 48 which rest in bearings 49 and 50 in the disk 41 and 51 and 52 in the cover 44. The gears are designated 53 and 54 and interposed between their hubs and the shafts 47 and 48 are sets of roller bearings 55 and 56, the roller bearings being held in place by the plates 57 and 58 for the set 55 and 59 and 60 for the set 56. The gears 53 and 54 are driven by a driving gear 61 integral with a sleeved hub 62 splined on the end of the axle members 39 and 40.

In Figs. 1, 3, 4 and 6 only one axle member is shown, this being 39, it being understood that a duplicate set of driving mechanism is on the outer end of the axle member 40.

The sleeve 62 has its respective ends flared, the inner end being wedged on the conical portions 63 of its axle member and the outer end receiving a locking conical member 64 which is held in place by an appropriate washer 65, on the threaded end 65' of the axle member and held against turning by a lock washer 66, which has a key 66' engaging the washer 65, as clearly shown in Fig. 3. The lock washer is held in place by a jam nut 67 and the jam nut is preferably held against turning by a cotter pin 68.

The respective ends of the sleeve 62 are provided with ball races 69 and 70 in which are received a circular series of balls 71 and 72, which, in turn run in the ball races or rings 73 and 74, mounted in the hub and in the gear set carrying head respectively. The ring 74 is carried in the head, as clearly shown in Fig. 3. The ring 73 is carried by the outer member 75 of a split hub, which consists, in addition to the member 75, of an inner member 76. The outer member 75 has a threaded opening 77, which receives a hub cap 78 of appropriate construction, and it extends about the hub transmission elements and is preferably integral with the webs 79 and 80 of the wheel 81.

The hub element 75 is recessed or shouldered, as at 82, to receive an internally toothed gear ring 83, which meshes with the gears 53 and 54 and said shouldered portion also receives a flange 84 on the face of the inner hub member 76, the two hub members and the gear being secured together by the bolts 85, the ends 86 of which are adapted to be screwed into the member 76 and the outer end of each of which is provided with a nut 87 so that the outer hub member may be taken off without disturbing the gear ring member 82 with relation to the inner hub member 76. It will be apparent by reference to Fig. 3 that the bolt 86 is provided with a shoulder 88, which acts as a stop or a head to bear against the outer edge of the gear ring member 82 when it is in place. The inner hub member 76 is provided with a concave portion having an offset shoulder 89 in which fits a ball race 90, aligning with a complementary ball race 90' on the shouldered portion 92 of the transmission housing members 37 and 38 and in which are the balls 91, the ball races being shown as applied to the member 37.

There is also a lubricating packing 93 carried by the inner hub member 76, which bears against the outer end of each casting 22 and 23.

The inner hub members carry brake drums 94 and 95, the inner faces of which are adapted to be engaged by the integral brake bands 96 (see Fig. 3), the inner diameters of the brake drums being approximately equal to the diameters of the guard disks or plates 30 and 31 so that dust, dirt and other extraneous matter will, to a large extent at least, be excluded from the brake drum.

The transmission housing members 37 and 38 are splined or broached at their inner ends, as indicated at 97 and 98, which interengage with the broached or splined hub portions 99 and 100 on the portions 2 and 3 within the gear case, the extremities of the members 37 and 38 being threaded to receive lock washers or nuts 101 and 102, which will be accessible through the opening 103 closed by the removable cover 104. Therefore, when the transmission housing members 37 and 38 are adjusted by screwing the lock washers or nuts 101 and 102 on the threaded ends of the members 37 and 38 and the splined ends 105 and 106 of the axle members 39 and 40 are in spline engagement with the driven gears 107 and 108 of the differential, the mechanism is ready to operate.

If power is transmitted from the engine through the shaft 6 to the master wheel 8 of the differential, the differential housing 9 will rotate, carrying with it the pinions 109 on the spider 110, fixed to the housing so that the driven gear members 105 and 106 will be rotated in unison so long as the vehicle is moving in a straight line but in such manner that one of the shaft members 39 or 40 may overrun when the vehicle is differentiating, this being well understood. Motion is then communicated to the axle members or transmission shafts 39 and 40 to drive the gear 61, each of which in turn meshes with the gears 53 and 54 and through them transmits the power generated at the differential to the internally toothed gear rings 82 which, being fastened to the hub of the wheel, will cause the wheel to rotate on the anti-friction elements 71 and 91. The anti-friction balls 72 within the head on the end of the transmission case 37 or 38, as the case may be, serve to support the end and balance the axle member or transmission shaft 39 or 40 with respect to the transmission housing 37 or 38, which supports it.

The weight exerted upon the axle at the spring bed on either side of the transmission, for example, the spring bed 22, at a point indicated by the arrow "A," will generate a stress or force in the direction of the arrow "D" on the balls 91 in a downward direction, which, in turn, will cause the stress to be exerted in an upward direction on the balls 71 in the direction of the arrow "E" because the wheel, being mounted at one side of the spring bed 22, will have a yielding moment such that its axis will tend to revolve at right angles to the axis of the shaft 39 and about the balls 91 as a center. The stresses thus set up result in exerting a force upwardly against the shaft 39 which, in turn, exerts a stress against the balls 72 in the direction of the arrow "F" and causes the race 74 to bear against the head 41 of the transmission gear set in a direction indicated by the arrow "G." This latter stress is exerted at a point in juxtaposition to the initial stress but in the opposite direction, as clearly indicated by the arrows "D" and "G" so that the resultant of the several forces is concentrated in the race 90'.

A semi-floating axle will thus be provided which will reduce the impact of shocks and jars communicated to the gear teeth through the medium of the wheel as it travels over an uneven roadbed and, through the special construction and arrangement of the parts, concentrate the impact of vibration in the ball bearings indicated by 90, 91 and 90' mounted on the transmission gear set immediately adjacent the main housing of the axle.

In turning corners the axle will be subject to variations of the above system of stresses. For example, if the vehicle is turned so that the load exerts a pressure in the direction of the arrow "B", the load will be shifted from the balls 91 to the balls 71 and the axis of the wheel will tend to rotate about the balls 71 at right angles to the shaft 39 and the ultimate load will be concentrated at the point and in the direction indicated by the arrow "G". On the other hand, if the vehicle is turned in the opposite direction, the load will exert a pressure in the direction of the arrow "C" and the result will be the same as the static condition first described except that as the speed of the turn is increased, the stress indicated by the arrow "G" will be increased, thereby increasing the pressure within the ball race 90'.

During the ordinary travel of a vehicle, the axle is subject to these stresses at all times and regardless of the direction which the vehicle is turned, the wheel on one side is subject to the opposite stresses from that on the other and while in the above description, the stresses of one wheel have been followed out in detail, it should be understood that while one wheel is undergoing one condition, the wheel on the opposite end of the axle is undergoing the opposite set of stresses.

Figure 2:
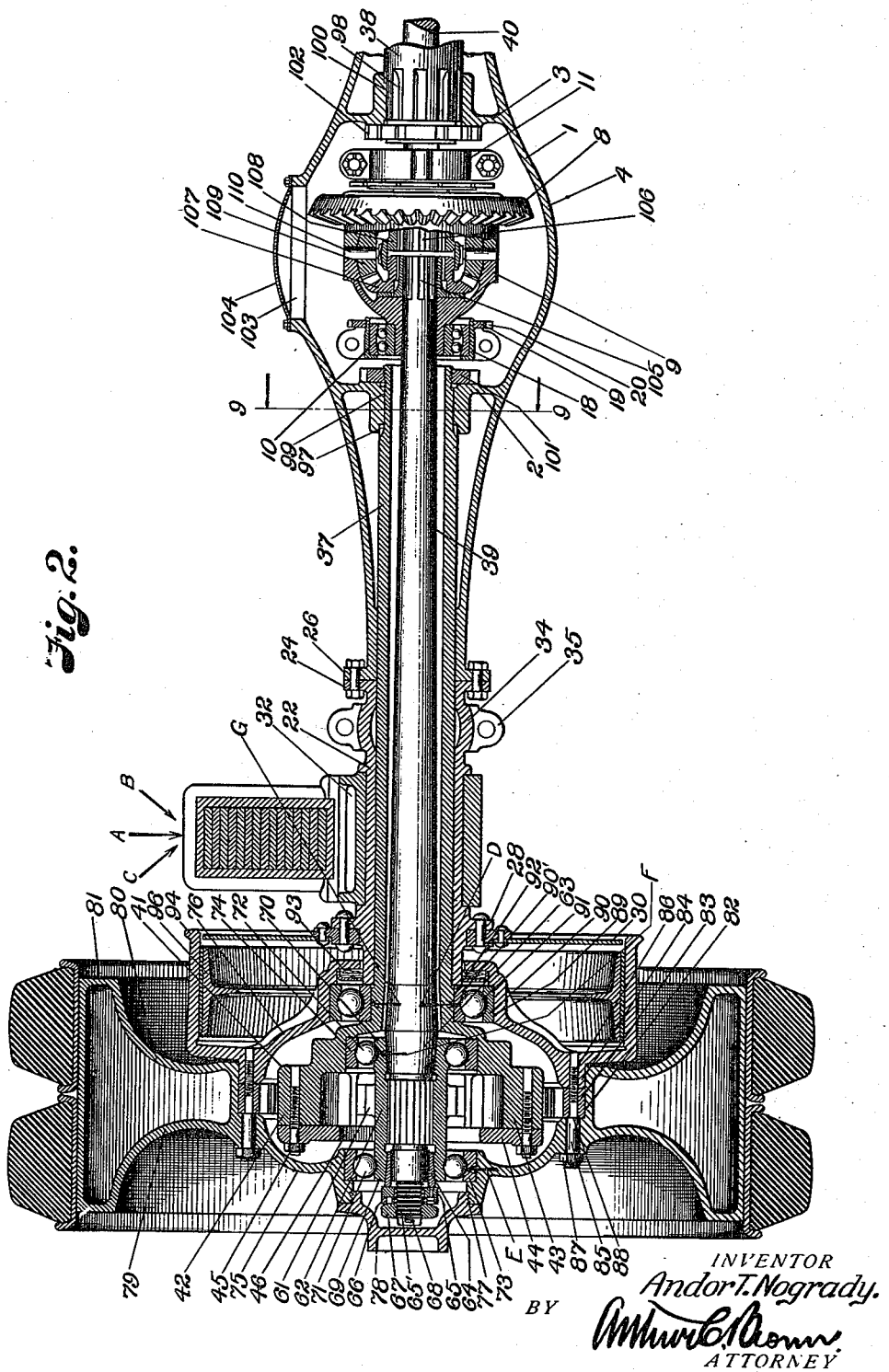
Fig. 2 is a vertical, sectional, elevational view of one-half of an axle constructed in accordance with my invention and showing the application of the differential gearing and the wheel.

The construction just described also tends to provide equal and opposite pressure perpendicularly of the gear sets in the wheel hub, as will be clearly apparent by reference to Figs. 1, 2 and 3.

If it is desired to remove the unitary structure that is, one-half of the power transmission axle, as shown in detail in Fig. 6, the device 87 may be unscrewed from the bolts 85 and the outer half of the wheel hub with the wheel may be removed. The adjusting end locking washers or nuts 101 and 102 may be taken off, access being had through the opening 103 and then the unit consisting of the transmission housing, for example, 37, and its axle member 39, together with the gear sets and their appurtenances, may be withdrawn from the axle housing.

This construction renders the removal of the unitary structure convenient, not only for inspection or repairs but for replacement, it sometimes being necessary to change the gear ratio between the transmission and the wheel. For example, according to my invention the power generating means, such as the engine, conventional change speed gears, transmission shaft and differential, may be manufactured as standard equipment, making increased production possible over practices in which the gear ratio must be changed forward of the differential gearing.

In order to change the gear ratio, any appropriate gear reduction may be made in the unitary structure, such as shown in Fig. 6, the outer diameters of the transmission housings 37 and 38 and the shafts 39 and 40 being standard for all different types of gear ratios. This is quite important because a truck equipped with a given ratio, which is not adapted for climbing hills or for moving heavy loads, may be quickly rendered adaptable for such work by substituting new transmission units on opposite sides of the differential; that is, substituting appropriate axle members, transmission housings and their complementary parts.

In Fig. 11 I have shown a slightly modified form designed to use standard forms of ball bearings in which an axle member 114 drives the hub of the wheel in the same manner as shown in the preferred form, the gear 61' having a relatively short hub 115 splined to the axle member 114, the ball races 116 and 117 being separate rings on the axle member 114 and aligning with the ball races 118 and 119 in which the balls 120 and 121 revolve. In other respects the construction is substantially like the preferred form.

What I claim and desire to secure by Letters Patent is:

1. An axle unit comprising an elongated tubular member having a head on one end provided with diametrically opposite slots in the perimeter thereof, gears mounted in the head and having teeth projecting through the slots, a shaft within the tubular elongated member, a gear on the shaft meshing with the gears in the head, the ends of the shaft projecting through opposite ends of the tubular member, a bearing ring about one end of the shaft adjacent to said head and provided with a ball race, and balls therein, resting upon the shaft, the opposite end of the shaft extending through the end of the tubular member distant from the head.

2. An axle construction for motor vehicles comprising an axle housing, a differential gearing mounted in the axle housing, tubular members rigidly secured within the housing on opposite sides of the differential gearing, each having a head rigid with the tubular member, gears mounted in each head and having teeth projecting through the perimeter of the head, shafts keyed to the driving members of the differential gearing and extending through the heads, gears on the shafts meshing with the gears in the heads, and wheels mounted upon the tubular members and upon the shafts and provided with hubs having toothed engagement with the gears in the heads on the tubular members.

3. An axle structure comprising an axle housing, a tubular member on each side of the center of the axle housing, a differential gearing between them, driving shafts connected to the differential gearing and projecting in opposite directions through the tubular member, wheels mounted upon the tubular members and upon the axles at the respective ends of the axle structure, and driving connections between the shafts and the wheels.

4. An axle structure comprising a differential gearing, a tubular elongated member on each side of the differential gearing, each tubular member having at its outer end a head, a wheel bearing on the tubular member adjacent to the head, a drive shaft projecting through the tubular member and through the head, a bearing on the projecting portion of the drive shaft on the side of the head opposite to the first named bearing, a bearing between the tubular member and the drive shaft, gears mounted in the head, a gear on the drive shaft for driving said gears in the head, a wheel hub mounted upon the first and second mentioned bearings, and a driving connection between the gears in the head and the hub of the wheel.

5. An axle structure for motor vehicles comprising a housing, a differential driving gear in the housing, tubular members within the housing on opposite sides of the differential gearing and extending to the opposite ends of the housing, spring seats on the housing, means for rigidly connecting the tubular members to the housing, a wheel hub supporting bearing on each tubular member, a drive shaft in each tubular member and in driving connection with the differential gearing, one end of each drive shaft extending through the housing, a hub supporting bearing on the extended end of each drive shaft, and a wheel having a hub supported upon the bearing on the tubular member and the bearing on the drive shaft, there being a driving connection between the drive shaft and the hub of each wheel.

6. An axle structure comprising an axle housing, tubular members within the housing and extending through opposite ends thereof, drive shafts within the tubular members and extending to the outer ends thereof, means for driving the drive shafts comprising a differential gearing, and wheels having hubs, the inner portion of each hub being supported upon the tubular member and the outer portion of each hub being supported upon the axle.

In testimony whereof I affix my signature.

ANDOR T. NOGRADY.